(12) United States Patent
Melander et al.

(10) Patent No.: US 9,459,896 B2
(45) Date of Patent: Oct. 4, 2016

(54) VIRTUAL MACHINE MERGING METHOD AND SYSTEM

(75) Inventors: Bob Melander, Sigtuna (SE); Jan-Erik Mångs, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 581 days.

(21) Appl. No.: 13/704,737

(22) PCT Filed: Jul. 2, 2010

(86) PCT No.: PCT/IB2010/001634
§ 371 (c)(1),
(2), (4) Date: Aug. 22, 2013

(87) PCT Pub. No.: WO2012/001445
PCT Pub. Date: Jan. 5, 2012

(65) Prior Publication Data
US 2014/0089919 A1    Mar. 27, 2014

(51) Int. Cl.
*G06F 9/455* (2006.01)
*G06F 9/48* (2006.01)

(52) U.S. Cl.
CPC .......... *G06F 9/45533* (2013.01); *G06F 9/455* (2013.01); *G06F 9/45558* (2013.01); *G06F 9/4856* (2013.01); *G06F 2009/4557* (2013.01)

(58) Field of Classification Search
CPC .. G06F 9/5083; G06F 9/5088; G06F 9/4856; G06F 2009/4557; G06F 2009/45562; G06F 9/45558; G06F 9/455; G06F 9/45533
See application file for complete search history.

(56) References Cited

U.S. PATENT DOCUMENTS

| | | | |
|---|---|---|---|
| 7,395,536 B2 * | 7/2008 | Verbeke et al. | 718/100 |
| 7,953,833 B2 * | 5/2011 | Ben-Shaul et al. | 709/222 |
| 2009/0031307 A1 * | 1/2009 | Chodroff | G06F 9/5077 718/100 |
| 2010/0049929 A1 | 2/2010 | Nagarkar et al. | |
| 2010/0106885 A1 | 4/2010 | Gao et al. | |
| 2010/0138832 A1 * | 6/2010 | Kim | G06F 9/45537 718/1 |

(Continued)

FOREIGN PATENT DOCUMENTS

| | | |
|---|---|---|
| CN | 101727331 A | 6/2010 |
| CN | 101739282 A | 6/2010 |
| CN | 101739287 A | 6/2010 |

OTHER PUBLICATIONS

International Search Report issued in corresponding International application No. PCT/IB2010/001634, mailing date Apr. 12, 2011.
Geist, G.A., et al., "Beyond PVM 3.4: What we've learned, What's next, and Why", Recent Advances in Parallel Virtual Machine and Message Passing Interface, 4th European PVM/MPI Users' Group Meeting, pp. 116-126, XP002628887, ISBN: 3-540-63697-8, 1997.

(Continued)

*Primary Examiner* — Lewis A Bullock, Jr.
*Assistant Examiner* — Jacob Dascomb
(74) *Attorney, Agent, or Firm* — Patent Portfolio Builders PLLC (57) ABSTRACT

A system, computer readable medium and method for merging a first virtual machine and a second virtual machine that runs on a same or different physical machine. The method includes a step of receiving instructions for merging processes of the first virtual machine with processes of the second virtual machine; a step of merging the first virtual machine with the second virtual machine onto a first physical machine; a step of merging an operating system of the first virtual machine with an operating system of the second virtual machine onto the first physical machine; and a step of maintaining active in the merged virtual machine each process that was active prior to merging the first and second virtual machines.

18 Claims, 7 Drawing Sheets

(56) References Cited

U.S. PATENT DOCUMENTS

| | | | |
|---|---|---|---|
| 2010/0257269 A1* | 10/2010 | Clark | G06F 9/4856 709/226 |
| 2011/0264788 A1* | 10/2011 | Costa | G06F 9/5077 709/224 |
| 2011/0271278 A1* | 11/2011 | Dittrich | G06F 8/60 718/1 |
| 2012/0304169 A1* | 11/2012 | Anderson et al. | 718/1 |
| 2014/0026146 A1* | 1/2014 | Jahagirdar et al. | 718/105 |
| 2014/0033201 A1* | 1/2014 | Dawkins et al. | 718/1 |
| 2014/0157257 A1* | 6/2014 | Dow et al. | 718/1 |

OTHER PUBLICATIONS

International Preliminary Report on Patentability in corresponding International Application No. PCT/IB2010/001634 mailed Jan. 17, 2013.

First Office Action in corresponding Chinese Application No. 201080067913.5 dated Jun. 25, 2015.

Search Report in corresponding Chinese Application No. 201080067913.5 dated Jun. 15, 2015.

* cited by examiner

VIRTUAL MACHINE MERGING METHOD AND SYSTEM

TECHNICAL FIELD

The present invention generally relates to systems, software and methods and, more particularly, to mechanisms and techniques for splitting/merging virtual machines and their operating systems.

BACKGROUND

Figure 1:
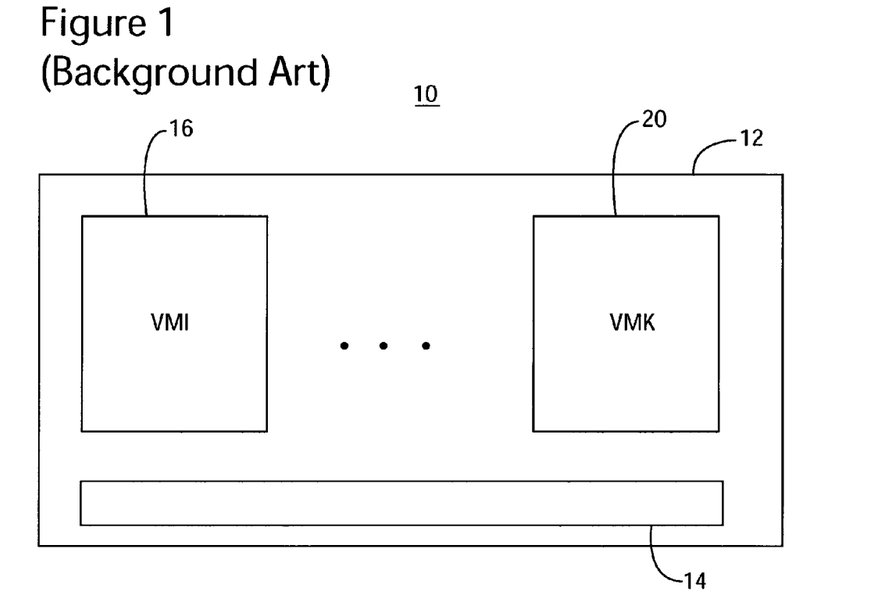
FIG. 1 is a schematic diagram of a physical machine having multiple virtual machines.

Virtual machine technology is today well established. A system virtual machine provides a complete system platform which supports the execution of a complete operating system (OS). System virtual machines (sometimes called hardware virtual machines) allow the sharing of the underlying physical machine resources between different virtual machines, each running its own operating system. For example, FIG. 1 shows a system 10 that includes a computer 12 having a virtualization engine 14, and plural virtual machines 16 to 20. The software layer providing the virtualization is called a virtual machine monitor or hypervisor 14. A hypervisor can run on bare hardware or on top of an operating system.

Some advantages of system virtual machines are: multiple OS environments can co-exist on the same computer, in strong isolation from each other; the virtual machine can provide an instruction set architecture that is somewhat different from that of the real machine; application provisioning, maintenance, high availability and disaster recovery; etc.

Information Technology (IT) professionals are extensively using the virtual machine technology for software development and by enterprises for their IT server infrastructure. For the x86 architecture, there are multiple vendors that provide support in this field, e.g., VMware, Citrix/XEN, Microsoft, and Sun.

One appealing aspect of virtualization is the decoupling of the (server) operating system from the physical hardware by the hypervisor shim. This shim creates a virtual machine that sits between the (server's) operating system and the hardware. This makes it possible to take an entire server instance and move it from one physical server machine to another physical server machine without making any reconfigurations of the server instance. "All" that is needed is to move the virtual machine.

With more recent hypervisors such transitions are possible when the virtual machine is running. Hence, the virtual machine (and thus the server) does not have to be taken off-line when maintenance needs to be performed on the physical server that supports the virtual machine. In other words, during the maintenance work, the virtual machine can be relocated on a secondary physical server and then moved back when the maintenance on the primary physical server has been completed.

However, there is not possible to split a virtual machine and distribute application processes among the virtual machine parts. In other words, the traditional hypervisors are capable of moving the virtual machine as a whole from a first server to a second server but not groups of application processes.

Accordingly, it would be desirable to provide devices, systems and methods that avoid the afore-described problems and drawbacks.

SUMMARY

Various application processes that run initially on a virtual machine may need to be moved among virtual machine parts that are moved on different physical machines. In this way, running application processes that last more than the terminal supporting the application processes do not have to be shut down and restarted at a later stage when the physical machine has to be shut down or moved around.

According to one exemplary embodiment, there is a method for merging a first virtual machine and a second virtual machine that run on a same or different physical machines. The method includes receiving instructions for merging processes of the first virtual machine with processes of the second virtual machine; merging the first virtual machine with the second virtual machine onto a first physical machine; merging an operating system of the first virtual machine with an operating system of the second virtual machine onto the first physical machine; and maintaining active in the merged virtual machine each process that was active prior to merging the first and second virtual machines.

According to another exemplary embodiment, there is a computing machine that includes a processor configured to run a virtualization engine that creates a virtual machine to run on the computing machine; and an interface connected to the processor. The interface is configured to receive instructions for merging processes of the first virtual machine with processes of a second virtual machine. The processor is configured to merge the first virtual machine with the second virtual machine onto the first physical machine, merge an operating system of the first virtual machine with an operating system of the second virtual machine onto the first physical machine, and maintain active in the merged virtual machine each process that was active prior to merging the first and second virtual machines.

According to yet another exemplary embodiment, there is a computing system that includes a first physical machine and a second physical machine. The first physical machine includes a processor configured to run a virtualization engine that creates a virtual machine to run on the computing machine; and an interface connected to the processor. The interface is configured to receive instructions for merging processes of the first virtual machine with processes of a second virtual machine. The virtualization engine is configured to merge the first virtual machine with the second virtual machine onto the first physical machine, merge an operating system of the first virtual machine with an operating system of the second virtual machine onto the first physical machine, and maintain active in the merged virtual machine each process that was active prior to merging into the first and second virtual machines.

It is an object to overcome some of the deficiencies discussed in the previous section and to provide a system and method for merging virtual machines that run on a physical machine. One or more of the independent claims advantageously provides such a mechanism for merging virtual machines and their hosted operating systems and allowing the hosted processes to continue their execution in the merged virtual machine parts.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a virtual machine. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

"Hot" relocation of virtual machines (i.e., running virtual machines) has many benefits, in particular for server environments. However, relocation (hot or cold) of a single homogenous virtual machine does not take full advantage of the possibilities provided by the virtualization. For example, it would be beneficial to use (hypervisor-based) virtualization as a method to (temporarily) redistribute onto several physical machines (computers, servers, nodes, mobile phones, etc.) processing that would normally be performed on a single physical machine. The opposite is also true.

For example, suppose that a physical machine runs an application that requires 3 hours of continuous access to a network. However, the physical machine is available at a specific location only 2 hours after which the machine needs to be moved to another location and maybe in the moving process to be shut down or lose connection to the network. It would be useful to have a method or process in place that allows the running application to still have access to the network even when the physical machines shuts down or moves away from the network. Such an example may be laptops running virtual machines. However, there is ongoing experimentation around virtualization on smartphones and similar resource limited terminals. Virtualization as a method for processing splitting/merging would also be useful for enabling low performing computers to dynamically offload work to high performing computers.

To make more concrete the situation in which a novel method of splitting a virtual machine is useful suppose that an operating system runs on a virtual machine on a physical terminal (e.g., a laptop). The laptop is at some location where it has high-bandwidth connectivity (e.g., 100 Mbps Ethernet). The laptop user starts a (several gigabytes) large file download. Shortly after the download begins, the user realizes he needs to be present in another location and he also needs to take his laptop to that location. He then most likely has to halt (or even worse abort) the download of the file. He could possibly continue over a 3G connection while away but in practice that may be too costly or lead to a suboptimal and slow data path.

An attractive solution for that user would be to split the virtual machine running on his terminal in two, and let one part continue to run on another terminal (desktop for example) at his home while the user takes the laptop. Thus, the application process can run uninterrupted on the virtual machine part that stays at home to continue the download operation while the laptop is shut down and moved to another location. Selected applications could remain on the virtual machine part on his laptop. When the user returns home, the split virtual machine may be configured to collapse (merge) to one machine, either the laptop or the home terminal.

The above example involved downloading. However, there are many other examples that could benefit from the novel method, e.g., applications involving demanding and heavy processing instead of communication. A professional user may have a computer in the mid-range performance span with virtualization. The user may use the computer to perform modeling in an advanced mechanical engineering simulation tool. When simulations are executed on the defined models, the user may split the virtual machine in two. The simulation processes may be hosted on one of the virtual machine parts and that part can then be migrated to a more powerful computer. Once the simulations are finished, the virtual machine parts can be collapsed into one, again running on the user's own computer.

Thus, according to an exemplary embodiment, a novel system and method are capable to split a virtual machine and its hosted operating system and move selected applications on various parts of the machine for continuing their execution. According to another exemplary embodiment, a novel system and method are capable of merging into one physical machine the various parts of a split virtual machine running on multiple physical machines. Each of these embodiments is now discussed in more details.

Figure 2:
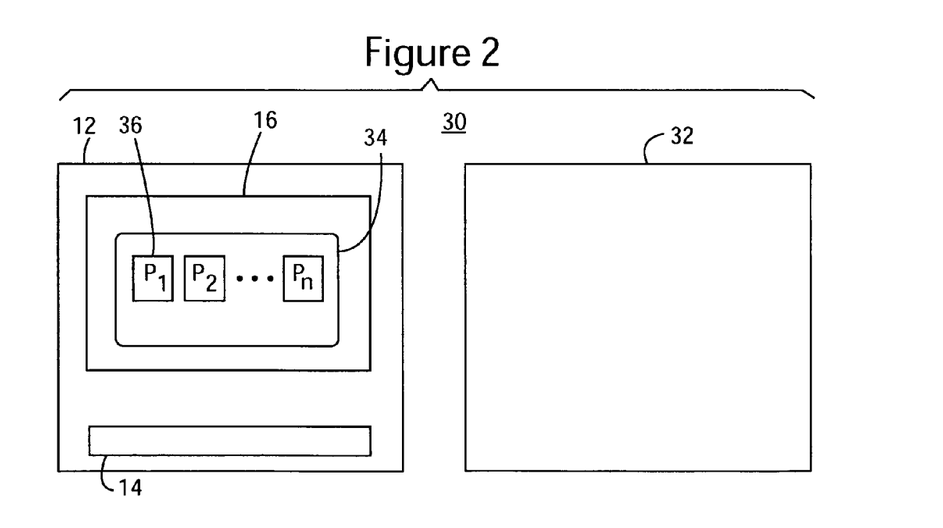
FIG. 2 is a schematic diagram of two physical machines having multiple virtual machines according to an exemplary embodiment.

According to an exemplary embodiment illustrated in FIG. 2, a system 30 that is configured to split a virtual machine and transfer parts on a whole new virtual machine on another physical machine are discussed now. An embodiment in which the virtual machines are merged is discussed later. System 30 may include a first physical machine 12 and a second physical machine 32. The first physical machine 12 includes a virtualization engine (or hypervisor) 14 that is configured to generate one or more virtual machines 16 that run on the first physical machine 12. The virtual machine 16 may include an operating system 34 on which one or more applications 36 are running. The virtual machine 16 and the operating system 34 may run on top of the virtualization engine 14.

Figure 3:
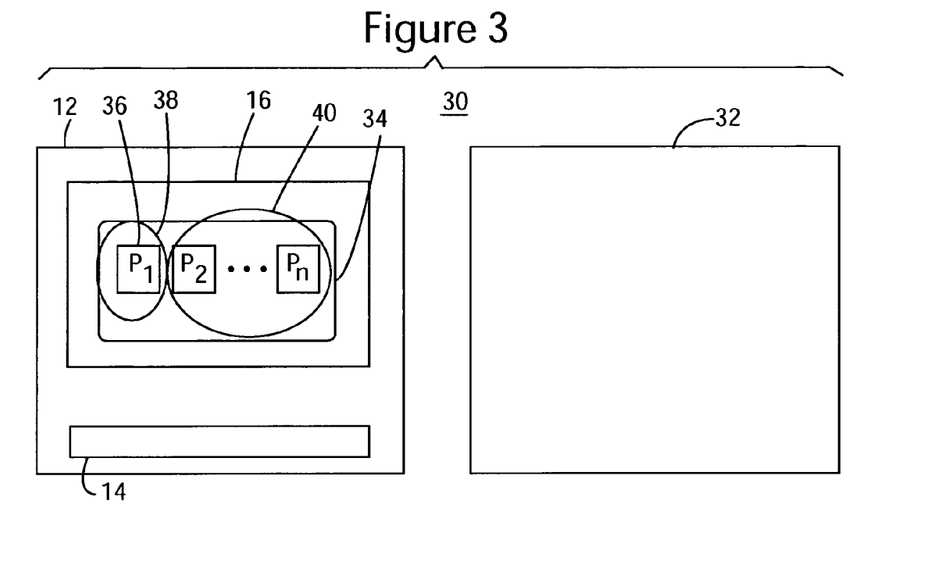
FIG. 3 is a schematic diagram of a virtual machine that divides processes into groups according to an exemplary embodiment.

Processes 36 (e.g., P1 to Pn) may be divided into two master groups 38 and 40 as shown in FIG. 3. In one application, the processes are divided in more than two groups. However, for simplicity, the case of splitting the processes in two groups is discussed next. The splitting of the processes may be performed at various levels, e.g., based on user input, automatically as decided by the virtualization engine 14 or an application, as decided by the operating system, based on a list of predetermined conditions, etc. A process may be part of one of the master groups or may be part of multiple groups. Again, the decision to which group an application belongs may be performed by the user, the virtualization engine, operating system, an application or based on a predetermined list. A function that implements the grouping of the processes, for example, a grouping function, may be implemented in the operating system, the virtualization engine, or both.

The master groups indicate which application is moved to which new virtual machine and also from which virtual machine part a certain process is to be taken when virtual machines merging is performed. In one application, all the processes are attached to an appropriate group. One application may be active on only one group or in multiple groups.

Figure 4:
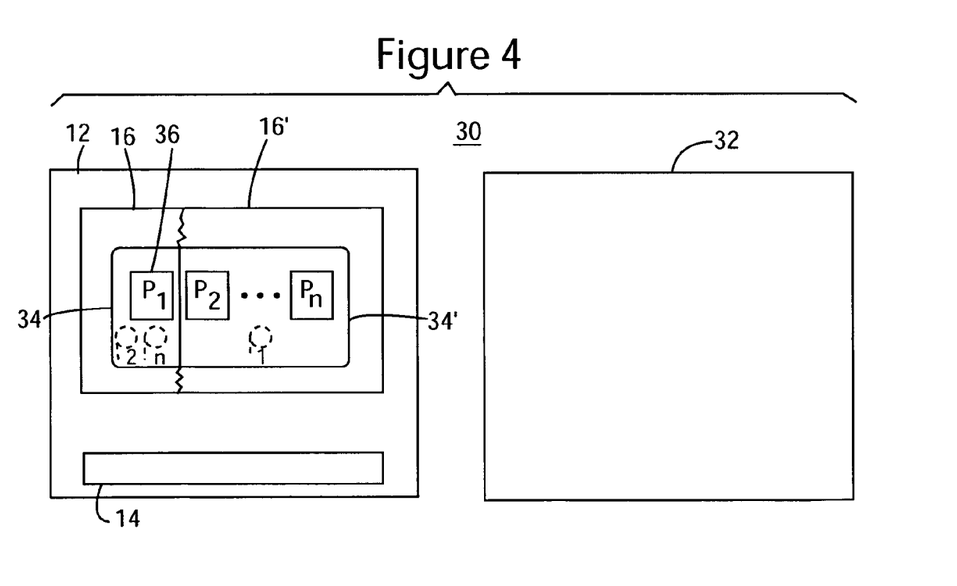
FIG. 4 is a schematic diagram illustrating a splitting of a virtual machine according to an exemplary embodiment.

When the processes are divided into corresponding groups, a splitting function (which may be implemented in the underlying virtualization engine 14, the operating system or both) begins splitting the virtual machine 16 into two or more virtual machines as shown in FIG. 4. Because the scenario of having only two groups of applications is discussed here, FIG. 4 shows that the virtual machine 16 is split into two virtual machines, 16 and 16'. However, if more groups are present, the virtual machine 16 may be split into more than two virtual machines. The splitting of the virtual machine 16 results in at least a new virtual machine 16'. However, for simplicity, it is considered that both virtual machines 16 and 16' that result after the splitting are new machines. The splitting of the virtual machine 16 takes place on the first physical machine 12.

It is noted in FIG. 4 that while the splitting is taking place, for example, process P1 may remain active on virtual machine 16 and inactive on the new virtual machine 16'. For this reason, the inactive processes are illustrated in FIG. 4 with a dash line. However, in another application, process P1 may remain active on both new virtual machines 16 and 16' or on the contrary, the process P1 may become inactive on both new machines. P1 has been discussed in this paragraph as an example but of course, any process can experience the above noted scenarios.

The splitting of the virtual machine 16 also implies the splitting of the operating system 34 into two new operating systems 34 and 34'. For simplicity, the two new operating systems 34 and 34' are called "new" although the operating system 34 is in fact not new. However, in one application, it is possible that the two new operating systems are in fact new.

Figure 5:
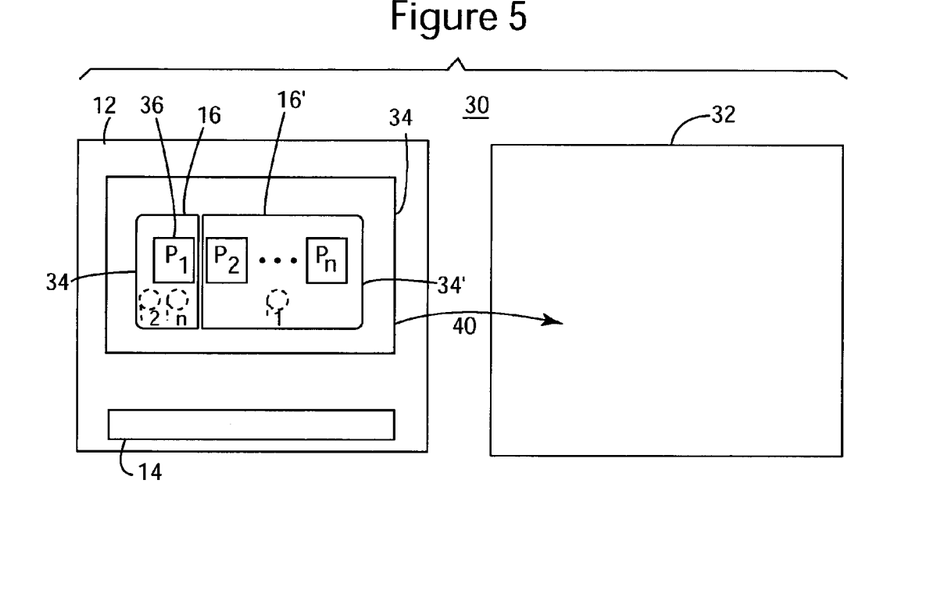
FIG. 5 is a schematic diagram illustrating a transfer of virtual machine parts from a first physical machine to a second physical machine according to an exemplary embodiment.
Figure 6:
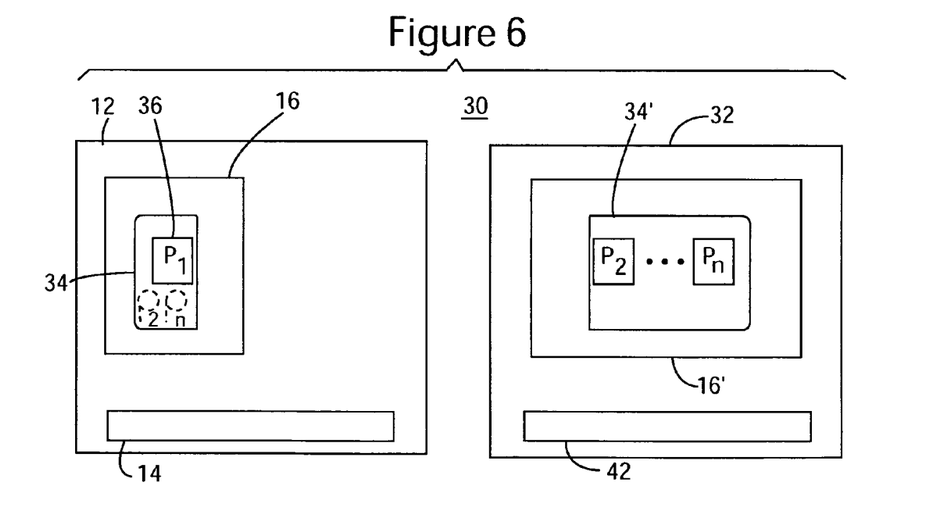
FIG. 6 is a schematic diagram illustrating virtual machine parts distributed on different physical machines according to an exemplary embodiment.

At the stage shown in FIG. 5, both the virtual machine 16 and the operating system 34 have been split into two new virtual machines and two new operating systems while the running processes P1 to Pn are continuously running on their corresponding virtual machine parts. At this stage, one or more of the new virtual machines may be moved, if desired, to a new physical machine 32. For example, as shown in FIG. 6, the virtual machine 16' and the operating system 34' are moved from the first physical machine 12 to the second physical machine 32 which has its own virtualization engine 42. This transfer may be performed while the corresponding processes are running (hot transfer) or after these processes have been stopped (cold transfer).

Figure 7:
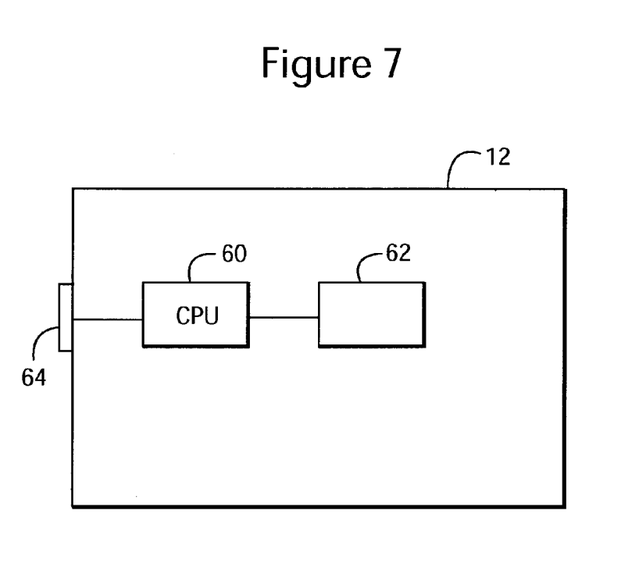
FIG. 7 is a schematic diagram of a simplified physical machine according to an exemplary embodiment.

The splitting process described above may be implemented in software to be run on a processor 60 as shown in FIG. 7. Processor 60 may be connected to a memory 62 and an interface 64. More details of such elements that are part of the physical machine 12 are discussed later.

Figure 8:
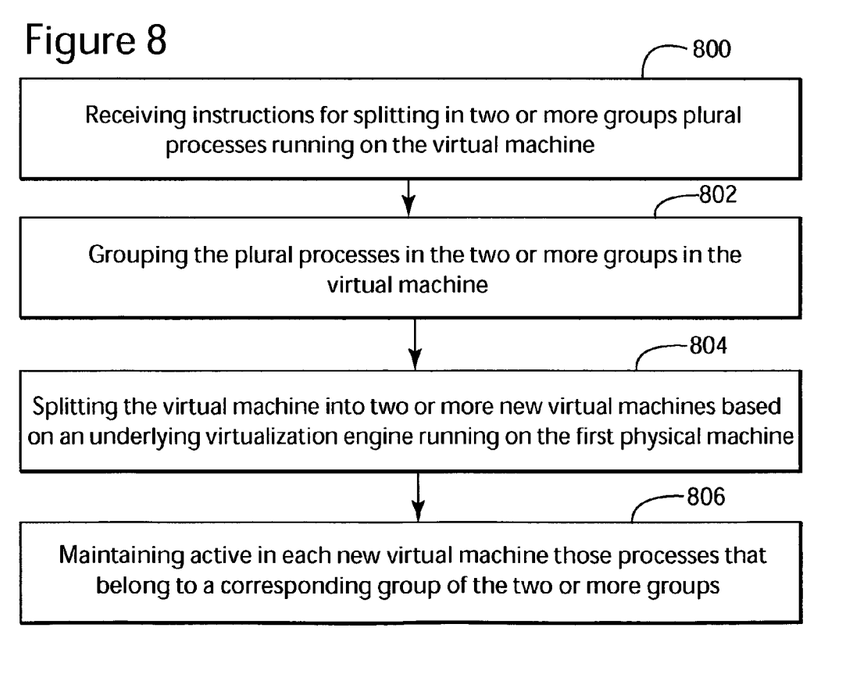
FIG. 8 is a flow chart of a method for splitting a virtual machine in at least two parts according to an exemplary embodiment.

The process for splitting a virtual machine (16) that runs on a first physical machine (12) that includes at least a processor (60) and a memory (62) may be summarized as follows. The process includes, as shown in FIG. 8, a step 800 of receiving instructions for splitting in two or more groups (38, 40) plural processes (36) running on the virtual machine (16); a step 802 of grouping the plural processes (36) in the two or more groups (38, 40) in the virtual machine (16); a step 804 of splitting the virtual machine (16) into two or more new virtual machines (16, 16') based on an underlying virtualization engine (14) running on the first physical machine (12); and a step 806 of maintaining active in each new virtual machine (16, 16') those processes (36) that belong to a corresponding group of the two or more groups (38, 40).

According to another exemplary embodiment, it is possible to merge various virtual machine parts located on different physical machines into a single virtual machine that runs on a single physical machine. In a sense, this process is the reverse of the splitting process discussed above. The various virtual machine parts to be merged into one should be compatible to each other and also their operating systems should be compatible to each other. For example, compatibility of the operating systems includes that the operating systems are of the same type, version, contain the same drivers, etc.

Figure 9:
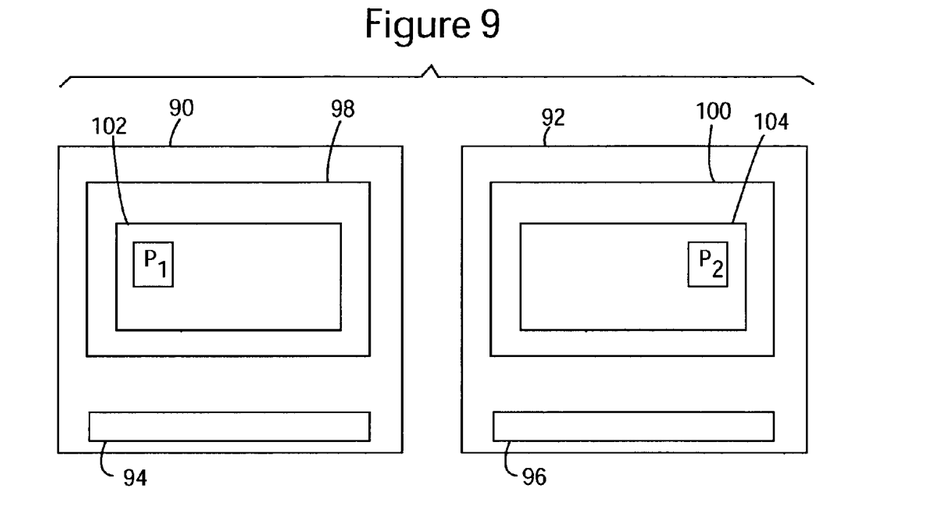
FIG. 9 is a schematic diagram of two physical machines having split virtual machine parts according to an exemplary embodiment.
Figure 10:
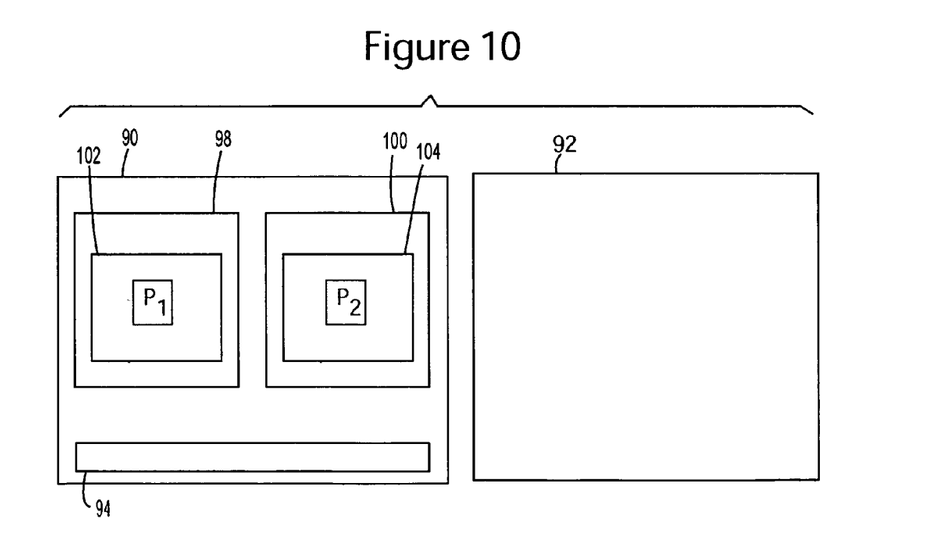
FIG. 10 is a schematic diagram of two virtual machine parts transferred to a same physical machine according to an exemplary embodiment.

As an example, consider two physical machines 90 and 92 as shown in FIG. 9, each having its own virtualization engine 94 and 96, respectively, and its own virtual machine 98 and 100, respectively. Virtual machine 98 has operating system 102 and virtual machine 100 has operating system 104. Assume, for simplicity, that process P1 runs on machine 90 and process P2 runs on machine 92. If a user intends to combine processes P1 and P2 on a single machine, e.g., physical machine 90, then the virtual machine 100 together with its operating system 104 and process P2 are transferred to the physical machine 90, as known in the art and shown in FIG. 10.

Figure 11:
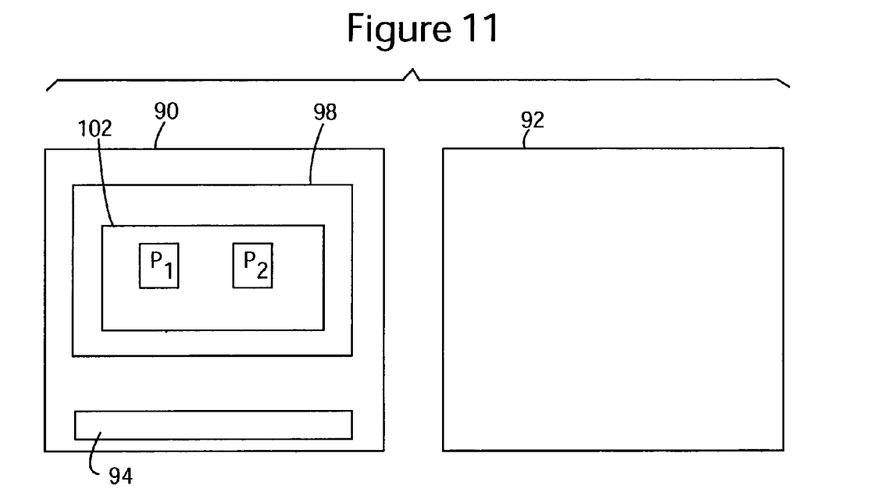
FIG. 11 is a schematic diagram of two virtual machine parts merged into one on a same physical machine according to an exemplary embodiment.

Then, a merging function (e.g., implemented in the virtualization engine 94, the operating system or both) is configured to merge the virtual machine 98 with the virtual machine 100 and the operating system 102 with the operating system 104, resulting in a single virtual machine 98 and a single operating system 102 as shown in FIG. 11. During this process, applications P1 and P2 are transferred (while running or after being shut down or suspended) to run in the common operating system 102. Thus, the merging of the various virtual machines 98 and 100 from different physical machines 90 and 92 is achieved as shown in FIG. 11. In one application, the operating systems 102 and 104 are identical in the sense that they are Windows based, or Linux based, etc.

Figure 12:
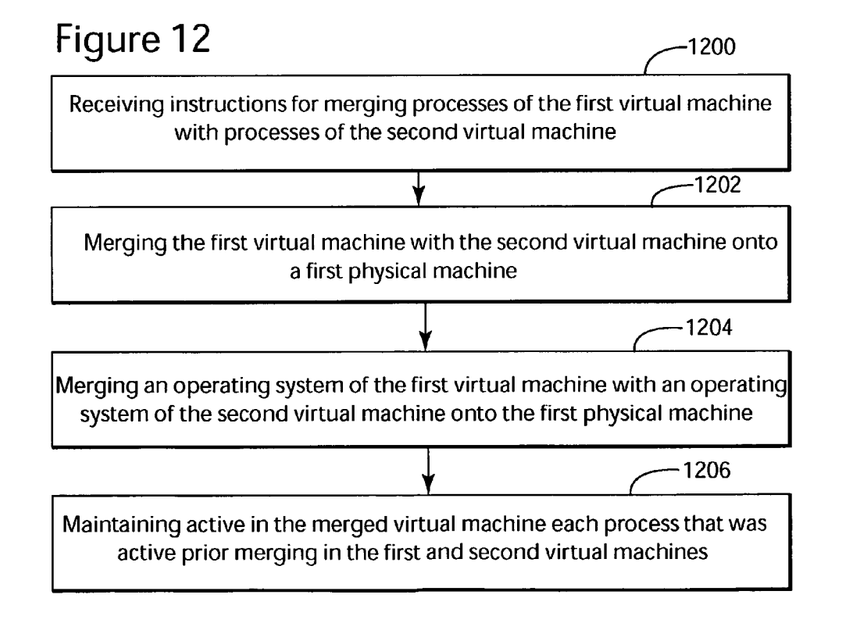
FIG. 12 is a flow chart of a method for merging virtual machine parts into a single virtual machine according to an exemplary embodiment.

According to an exemplary embodiment illustrated in FIG. 12, there is a method for merging a first virtual machine (98) and a second virtual machine (100) that run on a same or different physical machines (90, 92). The method includes a step 1200 of receiving instructions for merging processes (P1) of the first virtual machine (98) with processes (P2) of the second virtual machine (100); a step 1202 of merging the first virtual machine (98) with the second virtual machine (100) onto a first physical machine (90); a step 1204 of merging an operating system (102) of the first virtual machine (98) with an operating system (104) of the second virtual machine (100) onto the first physical machine (90); and a step 1206 of maintaining active in the merged virtual machine each process that was active prior to merging the first and second virtual machines (98, 100).

It is noted that the following situation may occur. Assume that an original virtual machine have been split in two new virtual machine parts and a single process P1 from the original virtual machine was allowed to run on both the first and second new virtual machines. When merging the virtual machine parts into the original virtual machine, one process P1 needs to be selected to further run on the merged virtual machine. One criteria to be used for selecting the process may be how advanced is that process. For example, suppose that the process is downloading a large file. The above noted criteria may select that process that has downloaded most of the file. Other similar criteria may be used.

According to an exemplary embodiment, for one or both of the splitting and merging processes, the physical resources of the physical machines may be handled as follows. For the case with no connectivity (e.g., two physical machines cannot establish or maintain communication over a network due to a lack of coverage or lack of wired access available, or interconnecting links that are broken down, etc.) a state of the processor (e.g., CPU) is transferred, when necessary, from a physical machine to another physical machine similar to how a virtual machine is hot relocated in the art. The same is true for memory (e.g., RAM) relocation. The storage facilities may be handled by copying the information stored from one physical system to the other physical system or the storage facilities of the machines may be networked, network attached storage (NAS). Regarding the network capabilities, for example, the IP address of the new virtual machine changes relative to the old virtual machines. However, many applications (processes) can handle changes of IP addresses or may not be using the IP address of the machine. The screen for one of the physical machines may be suspended while the screen for another physical machines may be kept active.

For the case with connectivity (where connectivity is defined as being opposite to the case of no connectivity discussed above), the CPU and RAM memory are handled similar to the case without connectivity. However, the storage facilities can be handled differently, e.g., operations are relayed back to source (first physical machine) or network disk from the second physical machine. Regarding the network, a tunneling process may be used.

Thus, for the splitting/merging processes, the operating system needs to be modified to implement the splitting and/or merging of virtual machines but this process is happening all the time to cater to new virtualization features introduced in hardware (e.g., the CPUs). There are also several ways to modify an operating system. For example, the installation of Vmware tools (with its special drivers, etc.) may be considered an operating system modification.

One advantage of one or more of the exemplary embodiments is the possibility to relocate a running application from one physical machine to another physical machine without making any changes to the design of the application. Another advantage of the novel process for splitting and/or merging a virtual machine is that it opens new ways of integrating end user devices with cloud infrastructures residing in, e.g., data centers. Further, a user is given the ability to (temporarily) transfer a set of applications running on the user's computer on a machine having more resources (like a more powerful CPU or more memory).

Figure 13:
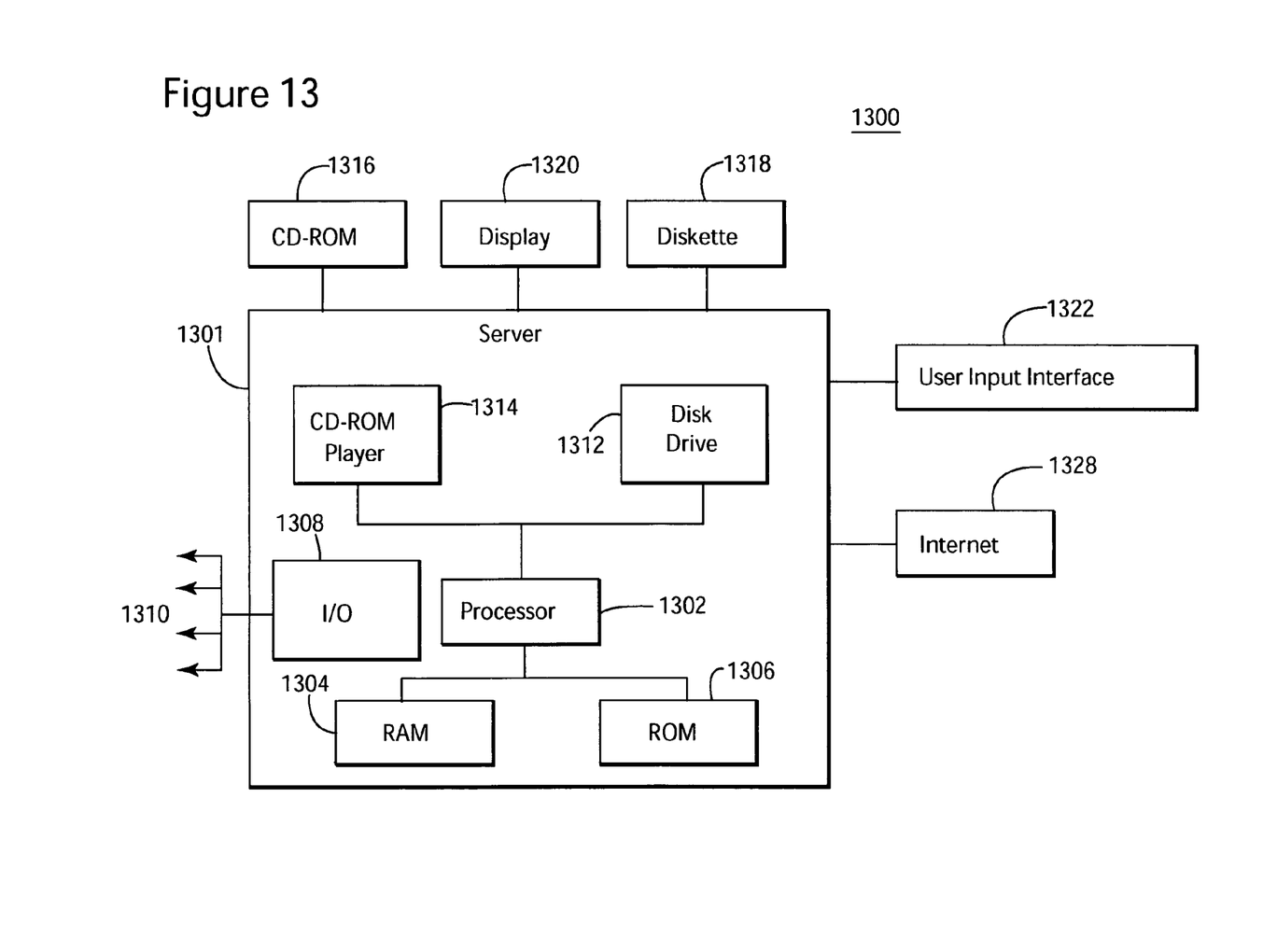
FIG. 13 is a schematic diagram of a physical machine.

For purposes of illustration and not of limitation, an example of a representative physical machine 1300 capable of carrying out operations in accordance with the exemplary embodiments is illustrated in FIG. 13. It should be recognized, however, that the principles of the present exemplary embodiments are equally applicable to standard computing systems. Hardware, firmware, software or a combination thereof may be used to perform the various steps and operations described herein.

The exemplary physical machine 1300 suitable for performing the activities described in the exemplary embodiments may include server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as is known in the art, as dictated by software and/or firmware instructions.

The server 1301 may also include one or more data storage devices, including hard and floppy disk drives 1312, CD-ROM drives 1314, and other hardware capable of reading and/or storing information such as DVD, etc. In one embodiment, software for carrying out the above discussed steps may be stored and distributed on a CD-ROM 1316, diskette 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD displays, plasma display, cathode ray tubes (CRT), etc. A user input interface 1322 is provided, including one or more user interface mechanisms such as a mouse, keyboard, microphone, touch pad, touch screen, voice-recognition system, etc.

The server 1301 may be coupled to other computing devices, such as the landline and/or wireless terminals and associated watcher applications, via a network. The server may be part of a larger network configuration as in a global area network (GAN) such as the Internet 1328, which allows ultimate connection to the various landline and/or mobile client/watcher devices.

The disclosed exemplary embodiments provide a system, a method and a computer program product for splitting and/or merging virtual machine parts. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention.

However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for merging a first virtual machine and a second virtual machine that run on a same or different physical machines, the method comprising:
   receiving instructions for merging processes of the first virtual machine with processes of the second virtual machine;
   merging the first virtual machine with the second virtual machine onto a first physical machine;
   after the virtual machines are merged, merging an operating system of the first virtual machine, which 1) executes a first set of applications and 2) is a particular type of operating system, with an operating system of the second virtual machine, which 1) executes a second set of applications and 2) is of the same type as the operating system of the first virtual machine, onto the first physical machine such that the merged operating system executes all of the applications from the first and second sets of applications;
   determining, for each process running on the first virtual machine that has an identical process running on the second virtual machine, which of the identical processes is more advanced, wherein determining which process is more advanced is based on which process has downloaded a greater portion of a file;
   selecting the process that was determined to be more advanced from the identical processes to run on the merged virtual machine; and
   maintaining active in the merged virtual machine, after the first and second virtual machines have finished merging, the selected process and all processes that did not have an identical process that were active prior to merging the first and second virtual machines.

2. The method of claim 1, further comprising:
   migrating the second virtual machine together with its corresponding processes from a second physical machine to the first physical machine.

3. The method of claim 2, further comprising:
   running the plural processes while migrating the second virtual machine.

4. The method of claim 2, wherein the first physical machine is a mobile phone, a laptop, a tablet or a mobile computing device while the second physical machine is a server or a fixed computing device.

5. The method of claim 2, wherein the first physical machine has less computational power than the second physical machine.

6. The method of claim 1, wherein the step of receiving instructions comprises:
   receiving instructions from a user;
   receiving instructions from a file stored in the first or second virtual machine;
   receiving instructions from an application that runs on the first or second virtual machine; or
   receiving instructions from the operating system of the first or second virtual machine, a network, or hardware.

7. The method of claim 1, further comprising:
   running the plural processes while merging the first and second virtual machines.

8. The method of claim 1, further comprising:
   stopping the processes while merging the first and second virtual machines.

9. The method of claim 1, further comprising:
   generating the first virtual machine by an underlying virtualization engine communicatively coupled to the first physical machine while running on the first physical machine.

10. A computing machine comprising:
    a processor configured to run a virtualization engine that creates a first virtual machine to run on the computing machine; and
    an interface connected to the processor and configured to receive instructions for merging processes of the first virtual machine with processes of a second virtual machine,
    wherein the processor is configured to:
      merge the first virtual machine with the second virtual machine onto the first physical machine,
      after the virtual machines are merged, merge an operating system of the first virtual machine, which 1) executes a first set of applications and 2) is a particular type of operating system, with an operating system of the second virtual machine, which 1) executes a second set of applications and 2) is of the same type as the operating system of the first virtual machine, onto the first physical machine such that the merged operating system executes all of the applications from the first and second sets of applications;
      determine, for each process running on the first virtual machine that has an identical process running on the second virtual machine, which of the identical processes is more advanced, wherein determining which process is more advanced is based on which process has downloaded a greater portion of a file;
      select the process that was determined to be more advanced from the identical processes to run on the merged virtual machine; and
      maintain active in the merged virtual machine, after the first and second virtual machines have finished merging, the selected process and all processes that did not have an identical process that were active prior to merging the first and second virtual machines.

11. The computing machine of claim 10, wherein the virtualization engine is configured to:
   receive on the first physical machine the second virtual machine together with its corresponding processes from a second physical machine.

12. The computing machine of claim 11, further comprising:
   running the plural processes while migrating the second virtual machine.

13. The computing machine of claim 11, wherein the first physical machine is a mobile phone, a laptop, a tablet or a mobile computing device while the second physical machine is a server or a fixed computing device.

14. The computing machine of claim 11, wherein the first physical machine has less computational power than the second physical machine.

15. The computing machine of claim 10, wherein the step of receiving instructions comprises:
   receiving instructions from a user;
   receiving instructions from a file stored in the virtual machine;
   receiving instructions from an application that runs on the virtual machine; or
   receiving instructions from the operating system, a network or hardware.

16. The computing machine of claim 10, further comprising:
   running the plural processes while merging the first and second virtual machines.

17. A computing system comprising:
   a first physical machine that includes:
      a processor configured to run a virtualization engine that creates a first virtual machine to run on the first physical machine; and
      an interface connected to the processor and configured to receive instructions for merging processes of the first virtual machine with processes of a second virtual machine, wherein the virtualization engine is configured to:
      merge the first virtual machine with the second virtual machine onto the first physical machine,
      after the virtual machines are merged, merge an operating system of the first virtual machine, which 1) executes a first set of applications and 2) is a particular type of operating system, with an operating system of the second virtual machine, which 1) executes a second set of applications and 2) is of the same type as the operating system of the first virtual machine, onto the first physical machine such that the merged operating system executes all of the applications from the first and second sets of applications;
      determine, for each process running on the first virtual machine that has an identical process running on the second virtual machine, which of the identical processes is more advanced, wherein determining which process is more advanced is based on which process has downloaded a greater portion of a file;
      select the process that was determined to be more advanced from the identical processes to run on the merged virtual machine; and
      maintain active in the merged virtual machine, after the first and second virtual machines have finished merging, the selected process and all processes that did not have an identical process that were active prior to merging the first and second virtual machines.

18. The computing system of claim 17, wherein a second physical machine hosts the second virtual machine.

* * * * *